United States Patent [19]

Axenborg et al.

[11] 3,802,651
[45] Apr. 9, 1974

[54] ADJUSTING THRUST VECTOR OF EJECTION SEAT ROCKET MOTOR

[75] Inventors: Carl Evert Axenborg; Hans-Jörgen Theodor Mennborg; Sten Henrik Wedin, all of Linkoping, Sweden

[73] Assignee: Saab Aktiebolag, Linkoping, Sweden

[22] Filed: July 9, 1968

[21] Appl. No.: 743,383

[30] Foreign Application Priority Data
July 10, 1967 Sweden..................... 10405/67

[52] U.S. Cl. ........................................ 244/122 AD
[51] Int. Cl. ........................................ B64d 25/10
[58] Field of Search ............................ 244/122

[56] References Cited
UNITED STATES PATENTS
2,726,831  12/1955  Bleck et al. ............. 244/122.11
3,190,589  6/1965  Mennborg ............... 244/122.14
3,437,293  4/1969  Martin ..................... 244/122 R FOREIGN PATENTS OR APPLICATIONS
753,996  3/1967  Canada ................... 244/122.11

Primary Examiner—George E. A. Halvosa
Assistant Examiner—Barry L. Kelmachter

[57] ABSTRACT

For adjustment of the direction of its thrust vector, an ejection seat rocket motor is mounted on the ejectable frame element for bodily angular motion, or has an adjustable gas deflector. The seat element, heightwise adjustable on the frame element, has a motion transmitting connection with the rocket motor whereby the thrust vector is maintained in desired relation to the center of gravity of the seat/occupant mass in every position of seat adjustment. At high speeds an airspeed responsive member transiently engages, during ejection, a sensing member associated with said connection, modifying the thrust vector adjustment.

3 Claims, 8 Drawing Figures

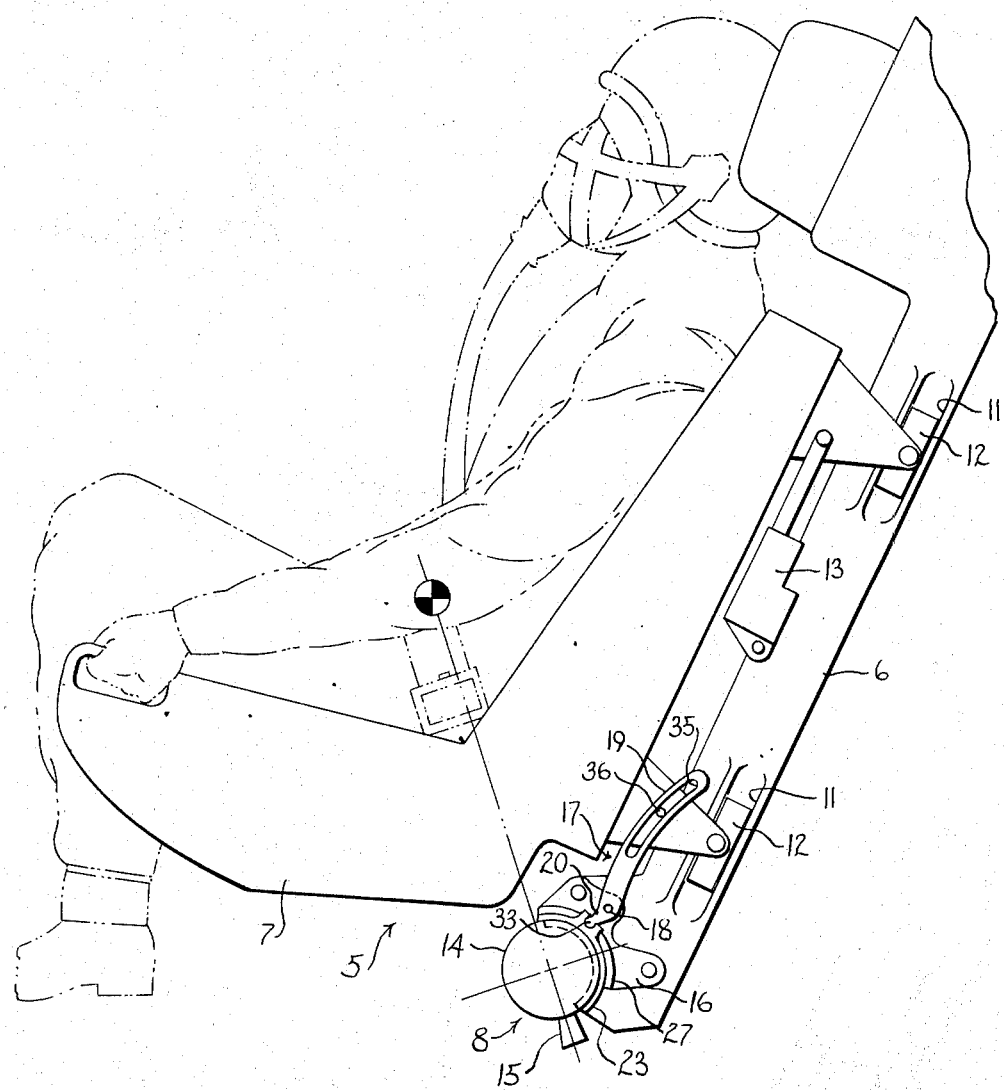

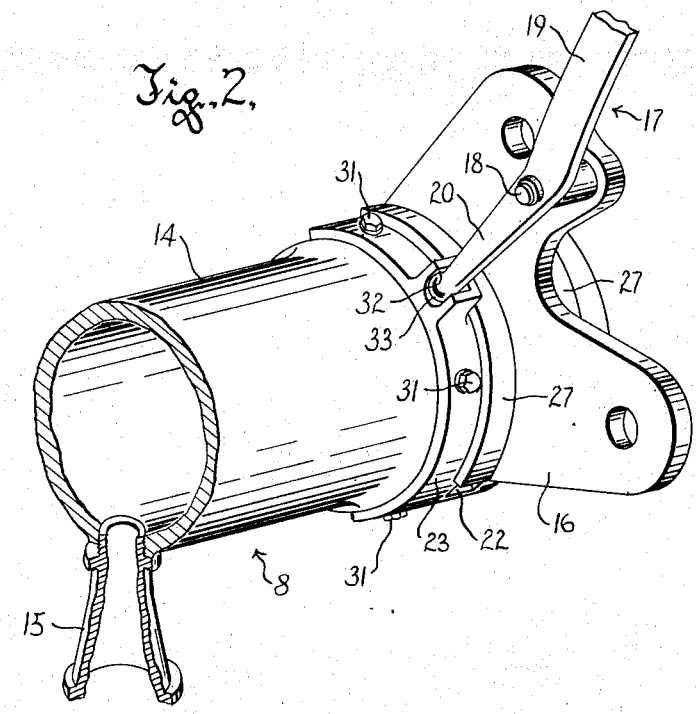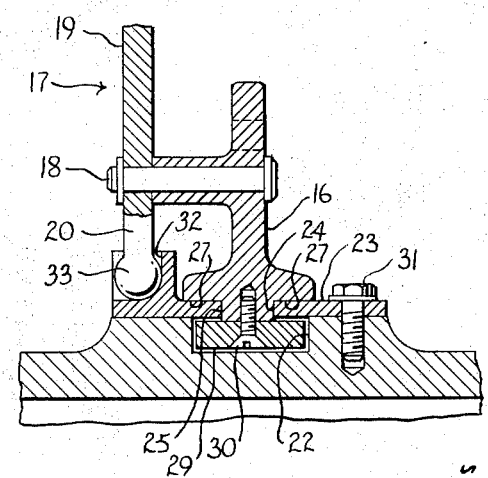

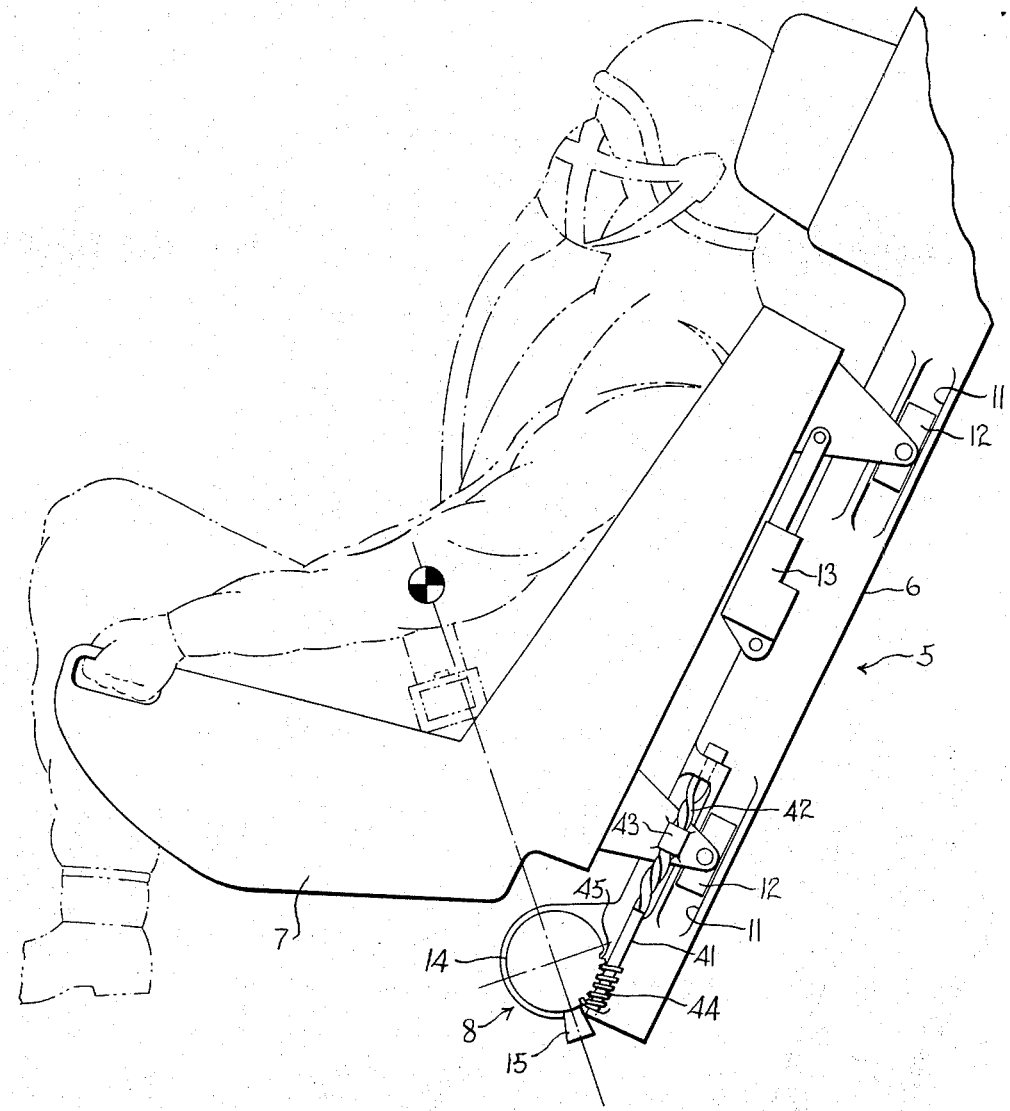

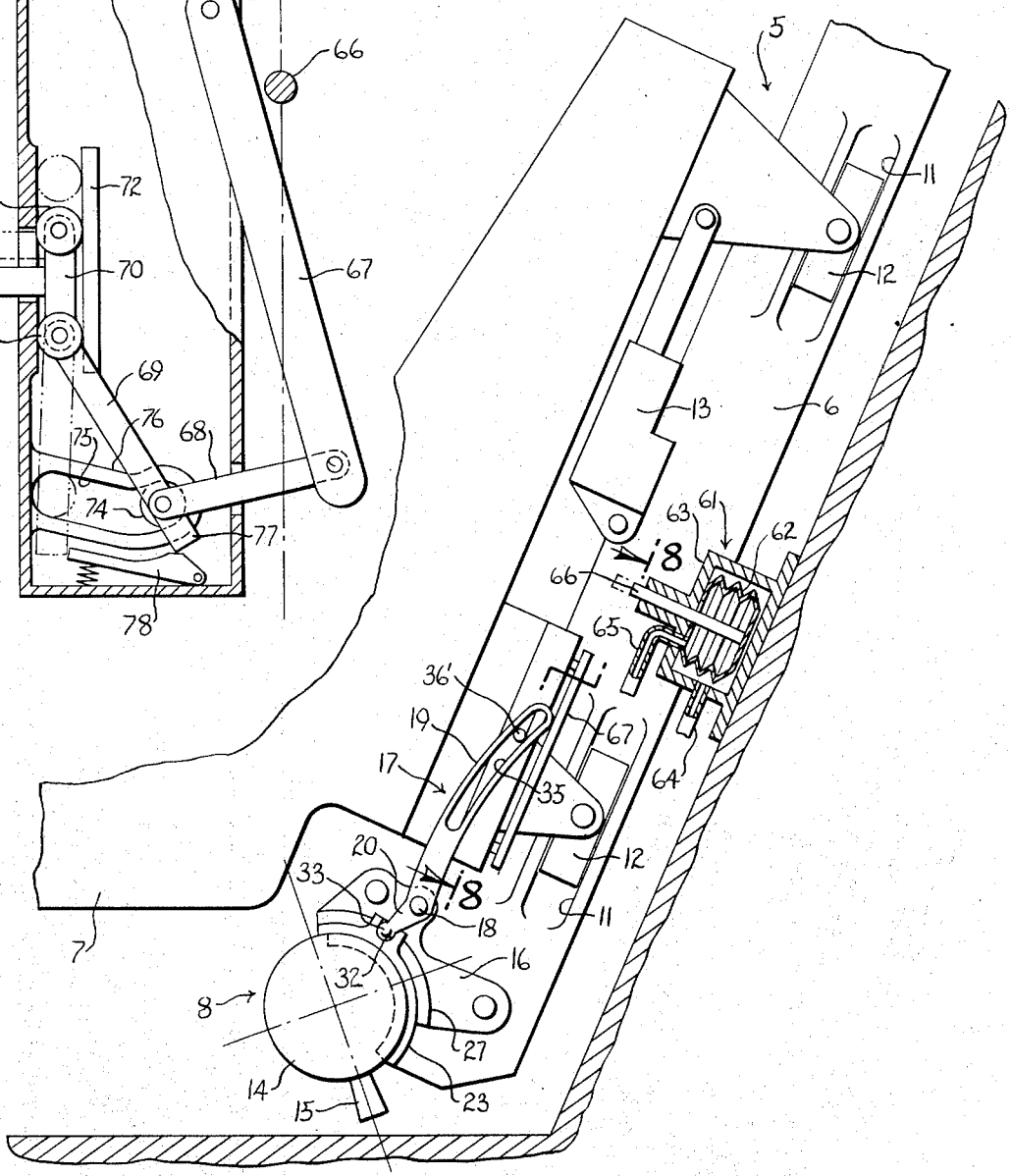

ADJUSTING THRUST VECTOR OF EJECTION SEAT ROCKET MOTOR

This invention pertains to improvements in ejection seats for emergency escape from an aircraft, and the invention relates more particularly to ejection seats of the type having a rocket motor for supplying thrust by which ejection of the seat and its occupant out of the aircraft, is at least assisted.

An ejection seat of the type here under consideration comprises a frame element which is normally fixed in an aircraft and a seat element which supports an occupant and which is carried by the the frame element for adjusting motion relative thereto and for ejecting motion therewith. Upon ejection, cooperating guide means on the frame element and on the fixed aircraft structure constrain the frame element to motion in a generally upright direction, while the thrust which imparts such motion to the seat is provided, either during the whole of ejection or during a second stage thereof, by a rocket motor that is mounted on the frame element, usually beneath the seat element.

It is well known that the orientation of the thrust vector of the rocket motor relative to the center of gravity of the seat/occupant mass is of great importance to the occupant's security during seat ejection. Unless the thrust vector extends through a point that lies within a certain distance from that center of gravity, the thrust vector cooperates with the center of gravity to produce a torque large enough to cause tumbling of the occupant after ejection and which can make the ejection unsafe.

The location of the center of gravity of the seat/occupant mass relative to the rocket motor depends upon a number of factors, many of which are difficult to determine exactly. These include the size and weight of the occupant, his equipment, and the attitude of the occupant and the relative disposition of his equipment and of the ejection seat parts during ejection. Since small changes in the location of the center of gravity can materially affect the movement of the seat/occupant mass in the air, it is essential, in order to obtain proper functioning of the escape system, that as many as possible of the factors which affect the relationship of the thrust vector to the center of gravity be taken into account, and that the orientation of the thrust vector be brought as nearly as possible into the correct relationship to the center of gravity.

Devices are known for adjusting the thrust vector of the rocket motor in accordance with the weight of the seat occupant. However, these devices do not satisfactorily solve the problem of thrust vector orientation because they do not take account of certain variables that have a major influence upon the required orientation of the thrust vector.

One of these is the up-and-down position of adjustment of the seat element relative to the frame element. A substantial range of such up-and-down adjustment must be provided for, not only to accommodate airmen of different sizes, but also to suit the different situations in which a particular airman may find himself. Thus in many modern combat airplanes the pilot must adjust the seat element of his ejection seat to a rather elevated position for takeoff and landing so that he can have a good view of the ground, but to a lower position in flight so that his eyes will be in a proper alignment with sighting instrumentalities and other equipment in the airplane.

Such adjustment of the seat element relative to the frame element involves a travel of the center of gravity of the seat/occupant mass relative to the rocket motor, which is mounted on the frame element; but heretofore such travel has not been compensated for with an appropriate reorientation of the thrust vector of the rocket motor, to maintain it in the proper relationship to the seat/occupant center of gravity. It will be appreciated that the detrimental effects of travel of the center of gravity due to seat adjustment have been particularly severe in the case of those arrangements wherein the thrust vector of the rocket motor was at a substantial inclination in the direction of seat adjustment, as in the apparatus disclosed in U.S. Pat. No. 3,190,589 to H. J. T. Mennborg.

Another factor not heretofore taken into account was the airspeed of the aircraft from which the seat was being ejected. If the orientation of the thrust vector was proper for ejection during low speed flight with a given seat/occupant center of gravity, that same orientation of the thrust vector was not suitable for high speed flight with the same seat/occupant center of gravity.

With the foregoing observations in mind, it is a general object of this invention to provide an ejection seat of the type comprising a seat element by which an occupant is carried, a frame element upon which the seat element is adjustably movable and which carries the seat element for ejection, and a rocket motor that has a defined thrust vector, which ejection seat embodies means for automatically adjusting the thrust vector of the rocket motor in accordance with adjustment of the seat element relative to the frame element, so that the thrust vector of the rocket motor is at all times maintained in substantially a predetermined relationship to the center of gravity of the seat/occupant mass.

Another object of this invention is to provide means in an ejection seat of the character described for effecting an automatic adjustment of the thrust vector of the rocket motor with each upward or downward movement of the seat element relative to the frame element, so that the thrust vector is at all times maintained in a predetermined relationship to the center of gravity of the mass comprising the seat and its occupant.

A further object of this invention is to provide an ejection seat of the character described having means for effecting an automatic adjustment of the orientation of the rocket motor thrust vector in accordance with the value of airspeed at the time of ejection.

More specifically, it is an object of this invention to provide an ejection seat of the character described that provides for automatic adjustment of the orientation of its rocket motor thrust vector to establish and maintain the same in substantially that relationship to the center of gravity of the seat/occupant mass which is required for safe ejection under the conditions prevailing at the time ejection occurs, and which in the course of effecting such adjustment takes account of the major variable factors that influence that relationship, namely the heightwise adjustment of the seat element relative to the frame element and the airspeed at the time of ejection.

With the above and other objects in view which will appear as the description proceeds, this invention resides in the construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of physical embodiments of the invention, constructed according to the best modes so far devised for the practical application of the principles thereof, and in which:

FIG. 1 is a more or less diagrammatic view in side elevation of an ejection seat embodying the principles of this invention, shown with an airman occupying the seat;

FIG. 2 is a detail perspective view on a larger scale of the structure by which the rocket motor is mounted for motion relative to the frame element to vary the orientation of its thrust vector;

FIG. 3 is a fragmentary longitudinal sectional view through the structure shown in FIG. 2;

FIG. 4 is a view generally similar to FIG. 1, but illustrating a modified embodiment of the invention;

FIG. 7 is again a view generally similar to FIG. 1 but illustrating still another modified embodiment of the invention; and FIG. 8 is a sectional view on an enlarged scale taken on the plane of the line 8—8 in FIG. 7.

Figure 5:
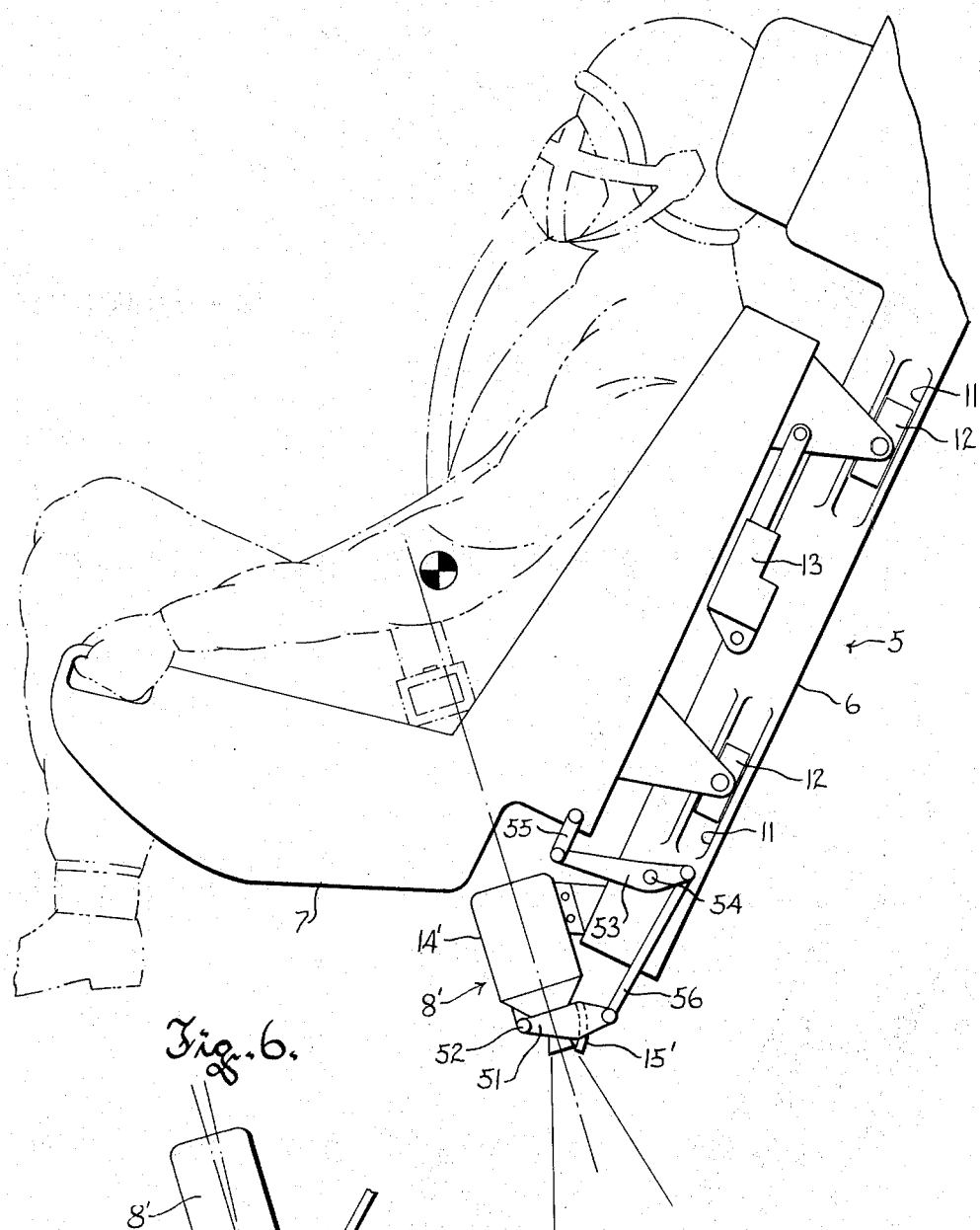
FIG. 5 is likewise a view generally similar to FIG. 1 but illustrating another variant of the invention.

Referring now to the accompanying drawings, the numeral 5 designates generally an ejection seat embodying the principles of this invention and comprising, in general, a frame element 6 which is adapted to be carried by relatively fixed structure in an aircraft, a seat element 7 by which an occupant is supported and which is carried by the frame element for adjusting motion relative thereto and for ejection therewith, and a rocket motor 8, also carried by the frame element, for producing ejection thrust.

The frame element 6 comprises a generally upright member that extends substantially parallel to the direction of seat ejection and cooperates with fixed structure of an aircraft in which the seat 5 is carried to be guided thereby during ejection, in accordance with practices well known in the art. At its opposite sides the frame member has track or groove portions 11 that also extend in the ejecting direction and in which are slideably received shoes 12 that are fixed on the seat element 7, whereby the seat element is constrained to adjusting motion relative to the frame element in directions generally parallel to that of ejection. Such adjustment of seat height is effected by a known jack mechanism 13 connected between the frame element and the seat element and which can be powered by a reversible electric motor driving a screw shaft or similar one-way transmission mechanism.

The rocket motor 8, which can suitably be of the type that is combined with a catapult gun, as disclosed in U.S. Pat. No. 3,190,589 to H.J.T. Mennborg, comprises, in general, gas generating means 14 and means for imparting a desired direction to gas issuing from the outlet of the gas generating means. As illustrated in FIG. 1, the gas generating means 14 comprises a cylindrical casing having its axis extending laterally to the seat and having an axially aligned row of radial outlets; and the gas directing means comprises nozzle means 15 fixed to the gas generating means at each of its outlets. The rocket motor is in any event mounted at the bottom of the frame element, beneath the level of the seat element and some distance to the rear of the center of gravity of the seat/occupant mass.

It will be seen from FIG. 1 that when the seat element is adjustingly raised or lowered relative to the frame element, the line that connects the rocket motor with the center of gravity of the seat/occupant mass will swing forwardly or rearwardly, owing to the fact that this line is not parallell with the direction of the adjusting motion of the seat element. Hence if the rocket motor gas directing means were in substantially fixed relation to the frame element, as has heretofore been the case with rocket propelled ejection seats, there would be only one position of heightwise adjustment of the seat element at which, with any particular occupant, the center of gravity of the seat/occupant mass would be in the desired relationship to the rocket motor thrust vector. But it is obviously impracticable to require the airman to bring his seat to a specified position of heightwise adjustment before ejecting, in order to insure that the seat/occupant center of gravity will be in a desired relationship to the rocket motor thrust vector.

According to the present invention therefore, provision is made for angular adjustment of the rocket motor gas directing means about a laterally extending axis, and there is a motion transmitting connection between the seat element 7 and the rocket motor whereby up-and-down adjustment of the seat automatically effects such angular adjustment of the gas directing means as maintains the thrust vector of the rocket motor in the desired relationship to the center of gravity of the seat/occupant mass throughout the range of height adjustment of the seat element.

As illustrated in FIG. 1, wherein the gas directing means 15 is fixed to the cylindrical gas generator casing 14, the rocket motor is mounted on a pair of brackets 16, one fixed to the frame element at each side thereof, for limited bodily rotation in opposite directions about the axis of the gas generator casing, to provide for swinging the nozzle means 15 to the desired orientation; and the motion transmitting connection comprises a lever 17 at one side of the frame. The lever 17 (which can be duplicated at both sides of the frame) is medially fulcrummed on a pin 18 fixed to its adjacent bracket 16, and it has an upper arm 19 that is connected with the seat element and a lower arm 20 that is eccentrically connected with the gas generator casing 14. The axis of the lever fulcrum pin 18 is parallel to that of the gas generator casing, and the lever 17 is oriented for generally fore-and-aft swinging motion.

The rocket motor can be mounted for rotation by means of structure providing arcuate dovetail joints on the end portions of its cylindrical gas generator casing 14, as best seen in FIGS. 2 and 3. To this end the gas generator casing has a circumferentially extending radially outwardly opening groove 22, over which is fastened an arcuate armature 23 in which there is a narrower slot 24. The bracket 16 has an arcuate tongue 25 which is received in the slot 24 in the armature and which is flanked by arcuate shoulders 27 that ride on the radially outer surface of the armature at each side of the slot. Secured to the tongue 25 on the bracket is a curved bar 29 that is received in the groove 22 in the casing 14, radially inwardly of the armature 23, to cooperate with the tongue 25 in constraining the casing to rotation. As will be readily understood from FIG. 3, the armature is first assembled onto the tongue 25 on the bracket and is secured in the proper relationship thereto by fastening the bar 29 to the bracket, as by means of bolts 30, after which the armature 23 is secured to the gas generator casing 14 as by means of bolts 31.

The armature 23 has a radially inwardly opening socket or well 32 therein in which is received a rather closely fitting spherical process 33 on the bottom of the lower arm 20 of the lever 17. The ball and socket connection 32, 33 between the lever and the armature translates all swinging motion of the lever into rotary motion of the gas generator casing 14 about its axis, and at the same time accommodates the component of swinging motion of the lever that is radial to the axis of the gas generator casing.

The upper arm 19 of the lever 17 has a curved slot 35 therein in which a pin 36 that is fixed on the seat element 7 has a close sliding fit. It will be apparent that the edges of the slot 35 cooperate with the pin 36 in the manner of a box cam, so that as the seat element 7 is adjustingly moved up and down relative to the frame element 6, swinging motion is imparted to the lever 17 by which the gas generator casing 14 is rotated. Further, it will be apparent that the curvature of the slot 35 is so chosen that for each position of heightwise adjustment of the seat element, there will be a corresponding angular position of the rocket motor such that the thrust vector of the rocket motor will extend through the center of gravity of the seat/occupant mass, or at least (allowing for unknowable factors in the relationship) in very close proximity to that center of gravity.

In the modified embodiment of the invention illustrated in FIG. 4, the frame element 6, seat element 7 and jack mechanism 13 are arranged as described above; the gas direction means of the rocket motor 8 again comprises nozzle means 15 fixed to the gas generator casing 14 at the outlet or outlets thereof; and the rocket motor is arranged for bodily adjusting rotation about a laterally extending axis to maintain its thrust vector in the desired relationship to the center of gravity of the seat/occupant mass.

In this case, however, the motion transmitting connection between the seat element and the rocket motor comprises a shaft 41 that extends parallel to the direction of adjustment of the seat and which is so mounted on the frame element as to be constrained to rotation on its axis. The upper portion of the shaft 41 is formed as a helix, as at 42, and is embraced by a nut 43 which is fixed on the seat element 7 so that upward or downward adjusting motion of the seat element effects rotation of the shaft in one direction or the other.

The lower end portion of the shaft 41 comprises a worm 44 which has its pitch opposite to that of the helix 42 and which meshes with a worm gear segment 45 on the gas generator casing 14 of the rocket motor. The shaft 41 thus translates up and down adjusting motion of the seat element into angular motion of the rocket motor about the axis of its gas generator casing. The pitch of the helix 42 is in such ratio to that of the worm 44 that in any position of heightwise adjustment of the seat element the rocket motor will have a corresponding rotational orientation, whereby its thrust vector will at all times substantially intersect the center of gravity of the seat/occupant mass.

Obviously, the means for imparting extension to the shaft 41 in unison with up and down adjusting motion of the seat element can comprise something other than the nut 43 and helix 42. Thus, for example, the shaft 41 could be directly rotatably driven by the same motor that comprises a part of the jack mechanism 13 by which the seat is raised and lowered, and could even comprise a downward extenon of a screw shaft driven by that motor.

Figure 6:
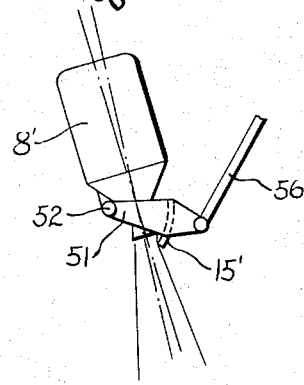
FIG. 6 is a detail view of the rocket motor of the FIG. 5 embodiment showing the gas directing means thereof in a position that effects a more rearward orientation of the thrust vector.

In the embodiment of the invention illustrated in FIGS. 5 and 6, the frame element 6, seat element 7 and jack mechanism 13 are again arranged as above described, but the rocket motor 8' comprises a gas generator casing 14' which is fixed to the frame element and movable gas directing means comprising a deflector 15' that is mounted on an arm 51 for limited swinging motion.

The arm 51 extends generally horizontally and swings about a pivot 52 at its front end that is fixed to the frame element 6. As it swings, it carries the deflector 15' between a position clear of the gas generator outlet, as shown in FIG. 5, and a position in which the deflector extends partway across said outlet and is spaced outwardly therefrom, as shown in FIG. 6. The gas generating means is fixed in an orientation such that with the deflector 15' fully retracted, the rocket motor thrust vector substantially intersects the center of gravity of the seat/occupant mass when the seat element 7 is at the bottom of its range of heightwise adjustment. As the seat element is moved upwardly relative to the frame element, the deflector 15' is caused to swing forwardly across the gas generator outlet in proportion to seat element elevation, to effect a downward deflection of the gas issuing from the gas generator and thereby maintain the desired orientation of the rocket motor thrust vector relative to the center of gravity. Since only a relatively small angular change in the thrust vector is needed to accommodate the full range of center of gravity travel due to heightwise seat adjustment, the deflector 15' can be effective to produce the necessary orientation of the thrust vector without interfering with the thrust produced by the rocket motor.

The deflector is caused to swing with adjusting motion of the seat element by means of a linkage comprising a lever 53 which extends generally fore-and-aft and which is medially fulcrummed on a pin 54 fixed to the frame element. A generally upright link 55, having its opposite ends pivotally connected with the seat element and with the forward arm of the lever 53, imparts up and down swinging motion to the lever 53 in consequence of adjusting up and down motion of the seat element. A second generally upright link 56 connects the rear end of the arm 51 with the rear arm of the lever 53, to constrain the arm 51 to swing with the lever. It will be apparent that with a proper lever arm ratio the swinging of the deflector 15' can be so coordinated with up and down adjusting motion of the seat element as to assure that the thrust vector will be maintained in the desired relationship to the center of gravity in all positions of seat element adjustment.

From the description to this point it will be seen how the orientation of the rocket motor thrust vector can be made unambiguously dependent upon the relative positions of the two main parts of an ejection seat, and it will be appreciated that the principles hereinabove explained are applicable to accommodation of the thrust vector orientation to an adjusting change of position of any significant part of the seat/occupant system. However, the invention also contemplates adjustment of thrust vector orientation for other parameters which must be taken into account in providing safe emergency escape. Thus the thrust vector should substantially intersect the seat/occupant center of gravity if ejection takes place in flight at low airspeed, but if ejection coours in high speed flight the thrust vector should be displaced somewhat to the rear of its low speed position, to compensate for the greater air forces on the seat/occupant system and thereby prevent tumbling under the influence of those forces.

FIGS. 7 and 8 illustrate mechanism which provides for an adjustment of the thrust vector orientation in accordance with the airspeed range of the aircraft at ejection. Mounted on a part of the fixed aircraft structure is an airspeed mechanism 61 comprising a bellows 62 enclosed in a sealed housing 63. This mechanism is connected with the pitot-static system of the aircraft by means of a static tube 64 which opens to the interior of the housing, outside the bellows, and a pitot tube 65 which opens to the interior of the bellows. Connected to the diaphragm of the bellows and slidably projecting through an aperture in the housing in an airspeed responsive member comprising a pin 66 that is actuated by the bellows. When the airspeed is below a predetermined value — that is, when the aircraft is flying in a low range of speeds — the pin 66 is in a retracted or inoperative position (illustrated in full lines in FIG. 7) in which it is clear of the ejection path of the seat and all mechanism associated therewith. When the airspeed is above said value, the bellows holds the pin 66 in an extended operative position (shown in broken lines) in which the pin lies in the ejection path of a sensing member 67 that is movably mounted on the seat element, and the pin 66 can then transiently engage the sensing member during ejection to move the sensing member from a normal position to a high speed position.

In the apparatus shown in FIGS. 7 and 8 the rocket motor 8 is mounted for bodily rotation on the frame element 6 and is connected with the seat element 7 for angular adjustment in accordance with heightwise adjustment of the seat element, all as in the FIG. 1 embodiment of the invention; but in this case the upper slotted arm 19 of the motion transmitting lever 17 cooperates with a pin 36' that is movable relative to the seat element instead of being fixed thereon, and said pin 36' is connected with the sensing member 67 to be moved thereby.

Specifically, the sensing member 67 can comprise an arm which is pivoted to the seat element at its upper end and which has its lower end connected through a pair of links 68 and 69 with a small carriage 70 on which the pin 36' is mounted. The carriage has small rollers 71 which cooperate with guide rails 72 on the seat element, whereby the carriage is constrained to limited up and down motion relative to the seat element. In its normal position, illustrated in FIG. 8, the sensing member arm 67 is inclined substantially to the vertical, and if during ejection the airspeed responsive pin 66 is in its retracted low speed position, the sensing member arm will clear said pin and remain in that inclined normal position. However, if the airspeed at ejection is in the higher range, so that the pin 66 is projected into the ejection path of the sensing member arm, the latter will engage said pin as the seat element rises in its ejecting motion, and the pin 66 will cam the arm 67 to a nearly vertical high speed position. Through the links 68 and 69 such swinging motion of the sensing member arm from its normal to its high speed position is translated into upward motion of the small carriage 70 on which the pin 36' is mounted, and this, in turn, imparts a swinging motion to the lever 17 by which the rocket motor 8 is angularly adjusted to bring its thrust vector to an orientation suitable for ejection in high speed flight.

Cooperating with the links 68 and 69 to translate swinging motion of the sensing member arm 67 into vertical motion of the carriage 70 is a roller 74 which is coaxial with the pivotal connection between said links and which rides in a closely fitting slot 75 in a guide 76 that is fixed on the seat element. The link 69 that is directly connected with the carriage 70 has a short arm 77 that cooperates with an upwardly biased latch member 78. When the sensing member is in its normal position, the latch member engages the short arm 77 under camming bias in such a manner that some degree of force must be applied to the sensing member to shift it out of its normal position while the small arm 77 on the link 69 cams the latch member out of its way. This prevents inadvertent movement of the sensing member arm 67 out of its normal position. When the sensing member has been actuated to its high speed position, the latch member 78 snaps behind the short arm 77 to hold the carriage 70 in its upper position and thus insure that the rocket motor will retain its orientation for high speed flight throughout the ejection.

From the foregoing description taken with the accompanying drawings it will be apparent that this invention provides an aircraft ejection seat with a rocket motor for ejection propulsion wherein means are provided for automatically establishing and maintaining the rocket motor thrust vector in an optimum relationship to the center of gravity of the seat/occupant system, taking account of the major factors which affect the location of that center of gravity relative to the rocket motor and the orientation which the thrust vector should have relative to that center of gravity under the conditions prevailing during ejection.

What is claimed as our invention is:

1. In combination with an airman's ejection seat comprising seat structure which is mounted in an aircraft to be ejectable therefrom, fixed structure in the aircraft by which said seat structure is guided along a defined path during an initial stage of ejecting movement relative to the aircraft, a rocket motor on said seat structure for imparting thrust thereto during at least a part of ejecting movement of the seat structure, and movable means on said seat structure for adjustably varying the direction of thrust of the rocket motor:

A. a sensing element carried by said seat structure for motion between a pair of defined positions, in one of which said sensing element is normally disposed;

B. means on the seat structure providing a motion transmitting connection between said sensing element and said movable means, whereby motion of the sensing element from its normal to its other position actuates the movable means to effect a predetermined change in the direction of thrust of the rocket motor; and C. an airspeed responsive member on said fixed structure which occupies an inoperative position clear of the ejection path of the sensing element when the aircraft is operating in one range of airspeeds and which in another range of airspeeds occupies an operative position projecting into the path of the sensing element for transient engagement thereby during ejection of the seat structure, such transient engagement moving the sensing element from its normal position to its said other position.

2. The combination of claim 1 wherein said seat structure comprises a frame and a seat pan that is carried by the frame for adjusting movement relative thereto, further characterized by:

D. means for adjustably varying the direction of thrust of the rocket motor in accordance with the position of the seat pan relative to the seat frame, the last mentioned means comprising a lever having a medial fulcrum and having one end connected with the seat pan and its other end connected with said movable means, said lever thus being swingable about its fulcrum in consequence of adjusting movement of the seat pan relative to the frame;

E. said sensing element comprising an arm mounted on the frame for swinging movement relative thereto; and F. said motion transmitting connection comprising
  1. fulcrum carrying means on the frame by which said fulcrum is constrained to move relative to the frame in directions to swing the lever about its first mentioned end and thus effect variation of the direction of rocket motor thrust, and
  2. link means connecting said arm with the fulcrum carrying means to effect motion of the fulcrum carrying means in one of its said directions in consequence of swinging of the arm from its said normal position to its said other position.

3. In an aircraft in which is mounted an airman's ejection seat comprising a seat element for supporting an occupant, a frame element by which the seat element is carried for adjusting motion relative to the frame element and for ejection therewith, and a rocket motor for propelling the ejection seat when it is out of the aircraft, mounted on the frame element beneath the seat element and comprising gas generating means having an outlet, gas directing means for causing thrust of the rocket motor to be exerted in a defined direction, and means mounting the gas directing means for motion that provides for fore-and-aft changes in said direction:

A. a sensing member mounted on one of said elements for motion relative thereto from a defined normal position to a defined second position, and for motion with said one element along a defined path during ejection;

B. an airspeed responsive member mounted on a fixed part of the aircraft for motion between a defined inoperative position clear of said path and which it occupies in one range of airspeeds, and a defined operative position, occupied in another range of airspeeds and in which the airspeed responsive member is disposed in said path to be transiently engaged by the sensing member during seat ejection and to thereby cause the sensing member to move to its said second position; and C. means providing a motion transmitting connection between the sensing member and the gas directing means for imparting a predetermined motion to the gas directing means upon motion of the sensing member from its normal to its said second position.

* * * * *